United States Patent [19]

Chou et al.

[11] Patent Number: 5,222,133

[45] Date of Patent: * Jun. 22, 1993

[54] METHOD OF PROTECTING COMPUTER SOFTWARE FROM UNAUTHORIZED EXECUTION USING MULTIPLE KEYS

[75] Inventors: Wayne W. Chou, 25 Hauley Pl., Ridgefield, Conn. 06877; Richard Erett, 278 Russet Rd., Stamford, Conn. 06903; Joseph M. Kulinets, Stamford, Conn.

[73] Assignees: Wayne W. Chou, Ridgefield; Richard Erett, Stamford, both of Conn.

[*] Notice: The portion of the term of this patent subsequent to Jan. 14, 2009 has been disclaimed.

[21] Appl. No.: 778,497

[22] Filed: Oct. 17, 1991

[51] Int. Cl.⁵ .............................................. H04L 9/00
[52] U.S. Cl. .................................................... 380/4
[58] Field of Search ........................................ 380/4, 3

[56] References Cited

U.S. PATENT DOCUMENTS

| | | | |
|---|---|---|---|
| 4,599,489 | 7/1986 | Cargile | 380/4 |
| 4,609,777 | 9/1986 | Cargile | 380/4 |
| 4,817,140 | 3/1989 | Chandra et al. | 380/4 |
| 4,866,769 | 9/1989 | Karp | 380/4 |
| 4,959,861 | 9/1990 | Howlette | 380/4 |
| 5,033,084 | 7/1991 | Beecher | 380/4 |
| 5,081,676 | 1/1992 | Chou et al. | 380/4 |
| 5,083,309 | 1/1992 | Beysson | 380/4 |

*Primary Examiner*—David Cain
*Attorney, Agent, or Firm*—Parmelee, Bollinger & Bramblett

[57] ABSTRACT

A method of protecting computer software is provided by storing a first key in a plug-in hardware device, storing an algorithm for processing a purality of keys including the first key in software to be protected, loading the software containing the algorithm in the computer and plugging in a hardware device in a communications port of the computer. A second key, external to the software, to be protected which bears a relationship to the first key by the algorithm is loaded into the computer where processing takes place of the first and second keys in the algorithm for deriving a control key, if present, for the continued processing of the software being protected. The step of loading the second key is performed using a computer keyboard, any input/output port, a hard disk file or any other method of entry in the computer. Additional keys external to the software which bear a relationship to the first and second keys configured in the algorithm may be provided.

5 Claims, 1 Drawing Sheet

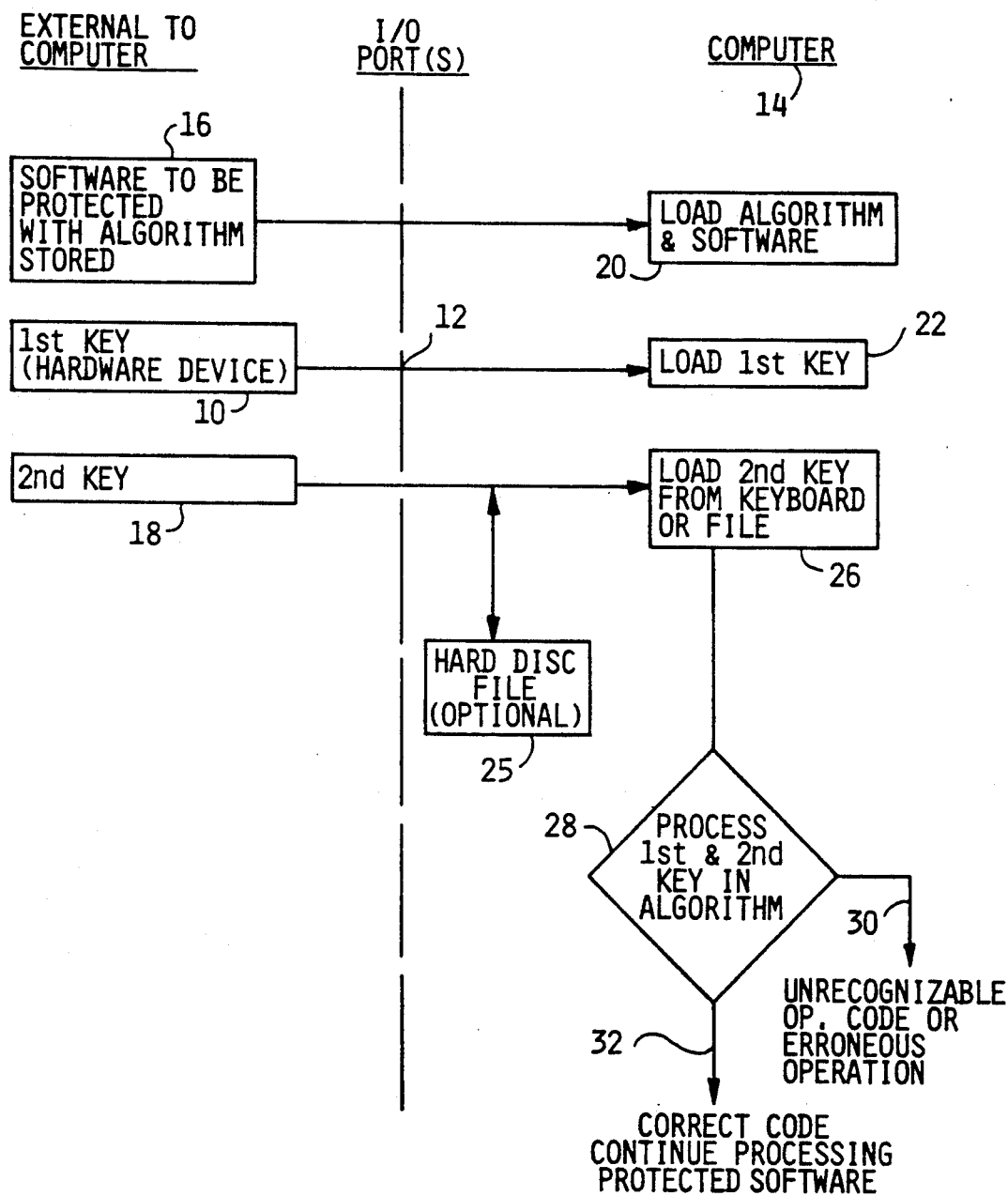

METHOD OF PROTECTING COMPUTER SOFTWARE FROM UNAUTHORIZED EXECUTION USING MULTIPLE KEYS

BACKGROUND OF THE INVENTION

This invention relates to the protection of computer software, and more particularly to a method of protecting software using multiple keys which are external to the software being protected to produce a single control key which will allow the protected software to be continued to be processed by the computer.

Hardware-based software protection devices are generally sold to end-users who receive a distribution diskette containing the desired program including a recorded key and a hardware device which contains a matching key. In order to operate the software, the supplied hardware portion is plugged into a specified port of the computer establishing a communications path between the hardware device and the computer. If the hardware device contains the correct key which matches the key recorded in the software, then the software is allowed to continue. However, the wrong key or the absence of such a key prevents the operation of the software.

In U.S. Pat. No. 4,458,315 to Uchenick a first key is stored in the program and a second key, physically separate from the program, is supplied to the customer with each program sold in a hardware based register. The first and second keys are compared to see if they bear a predetermined relationship to each other, in which case the program is authorized. In a first implementation, each secured program has the same first key in a hardware register and the secured program contains the second key. In a second implementation, different first keys are provided for each secured program, but the secured program copies supplied to the users must incorporate in advance a complete list of all second keys which are to be used with the different first keys.

Another approach is followed by U.S. Pat. No. 4,593,353 to Pickholtz in which first and second authorization codes are stored in the program and are read by the computer before the program is allowed to be executed. A hardware module containing a pseudorandom number generator unique to the authorized system receives the first authorization code as a key. The resultant number generated by the number generator which is a function of the key and pseudorandom generator algorithm is compared with the second authorization code which enables an execution signal to be generated in response to a positive comparison to enable the stored program to be executed.

One of the problems with the aforesaid approaches resides in the fact that all of the first keys used must be known in advance and stored in the original software program. For example, when software is offered for sale with additional modules, upgrades and features, such embellishments may be useful and are sold only to certain users and not to others. Because all the copies of the software in the aforesaid approaches have the same set of values of keys for comparison with the external hardware key, then another key or code must be supplied in another hardware device when the additional module is separately offered for sale, even if that additional module which is related to the basic software has been supplied in advance. Only such an approach could distinguish the legal users of additional software modules from others. The additional hardware device adds expense and time delays in ordering and shipping. Also in such a case, remote implementation, e.g., telephone or facsimile, is not possible.

The mass reproduction of the software device which has the keys incorporated therein of necessity limits the flexibility in the choice of keys, as well as compromising the security. If a key is stored in the software being protected, and that key is broken or discovered by a copier, all the software copies on which that key appears has thus been discovered eliminating the desired security.

SUMMARY OF THE INVENTION

Accordingly, it is an object of the present invention to provide a new and improved method for protecting computer software which permits mass replication of the software desired to be protected while providing the possibility of selling original options or upgrades modifying the original software by using the same hardware security device furnished with the original software package while preventing the unauthorized use of the copies of such additional options or upgrades.

Still another object of this invention is to provide an improved method for protecting computer software in which original options or modifications, such as upgrades may be authorized remotely by telephone, facsimile, or mail without compromising security or preventing the mass replication of the secured software.

In carrying out this invention in one illustrative embodiment thereof, a method of protecting computer software is provided comprising the steps of storing a plurality of unique first keys in a plurality plug-in hardware devices, each device having its own unique first key, establishing a plurality of unique second keys, each having a predetermined relationship with one of each of said plurality of first keys, storing an algorithm for processing said unique key pairs in software which is desired to be protected, supplying identical copies of said software to be protected together with said hardware devices, each having one of said first keys, one device with each of said copies, supplying said second key that forms said key pair with one of said first keys in said hardware device, inserting one of said hardware devices in a communication port of said computer, loading said software to be protected containing said algorithm in said computer, loading a second unique key external to said software device to be protected in said computer, and processing said first and second keys in said algorithm for deriving a control key, if present, for permitting the continued processing of the software being protected.

BRIEF DESCRIPTION OF THE DRAWING

The invention, together with further objects, aspects, features and advantages thereof will be more clearly understood from the following description taken in connection with the accompanying drawing which provides a combined block diagram and flow chart illustrating the method embodied in the present invention.

DESCRIPTION OF THE PREFERRED EMBODIMENTS

In the following description, terms used are defined as follows:

Primary or first key—refers to a physical hardware device that is initially shipped with a software package to be protected.

Secondary or second key—refers to a string input, e.g., alpha-numeric, hexadecimal, binary, etc. from the end user of the software package being protected. The secondary key can be in label form (supplied and affixed to the hardware device delivered to the end user), and may be stored on the computer disk in which the software is being used for subsequent recovery.

Control key—refers to a calculated value that is the result of information stored within the primary first key and that of the second key. The proprietary algorithm that does this calculation is contained within the software being protected.

Algorithm—is the relationship between the primary and secondary keys which form a unique key pair.

Original program—a software program which may include options, modules, libraries, etc.

Modifications—refers to all changes made to the original software program which are to be protected, such as additions, upgrades, etc.

In accordance with the present invention, a specific algorithm is provided to each software developer whose software is desired to be protected. For a given algorithm, there is a distinct relationship between the primary and secondary keys (key pair) that produces a proper and correct control key. The proprietary algorithm which has been furnished is contained in the software being protected. In order to activate modules of software packages that have already been distributed by the developer to a user site in the field, in accordance with the present invention, it is only necessary to supply the end user with another secondary key which along with the original first or primary key produces another control key. The newly created control key will be required to operate the newly activated upgrade which is defined herein as a modification of the original software program.

In order to prevent unauthorized use of a new secondary key, the end user will be initially supplied with a unique key pair. Since the unique key pair contains a unique hardware key (primary or first key), a unique second key is required to operate the software. Thus, the same secondary key will not operate another primary key in a neighboring or unauthorized site.

Should a modification to the protected software package be required, it will only be necessary to know the value of the primary or first key which is not secret. This can be determined by a simple utility supplied with the original software package and run by the user. The results of this utility can be displayed on an output device, screen or printer, etc. This information is then transmitted to the software developer or its agent and a modification can be sent with a new second key. No additional hardware is required, relieving any future hardware cost. Since unique key pairs are used to prevent cross-activation between end user sites, the algorithm can be constant for any given piece of software. Accordingly, replication of software does not require special handling and can be carried out in the usual manner.

Referring now to the drawing, illustrating the method embodied in the present invention, a unique primary or first key or code stored in a hardware device 10, such as a read-only memory (ROM), is plugged into a port 12 of a computer 14 which can thereby be accessed and loaded into the computer by means of a software program 16 being protected. A unique secondary or second key or code is entered via the keyboard (not shown) of the computer 14 or by any other convenient or suitable means which is also stored in the computer. The first and second keys provide a unique key pair which differs for each application, and different key pairs are supplied to each software developer. An algorithm 28 in the software being protected utilizes both keys 10 and 18 to produce a desired result which in essence becomes a control key 32 to yet another algorithm which allows the software to execute properly. If either or both of the two keys forming the unique key pair do not fit the algorithm as desired, a result which will occur which can be considered an error. Thus, the software program can be terminated thereby allowing only the proper combination of hardware key 10 and key 18, having been entered separately, to operate the software.

The method of the present invention as illustrated in the drawing comprises loading the software 16 to be protected with its algorithm stored therein in the computer represented by block 20. The primary or first key of the hardware device 10 which has been plugged into a communications port 12 of the computer 14 is loaded into the computer represented by block 22. The second key 18 is then loaded into the computer from the computer keyboard or optionally from a hard disk file 25 as represented by block 26 of the drawing. Program operation 28 takes place in which the first 10 and second 18 keys forming a unique key pair or set are processed in the algorithm 28 producing either output 30 or 32. If the output 30 is provided, this means that an unrecognizable operational code or an erroneous operation has taken place which is used to stop the processing of the program. On the other hand, if output 32 is provided, this indicates that a correct code exists, has been recognized, and thus will permit the continued processing of the protected software.

The algorithm 28 which may be employed in the aforesaid method may be any manipulation of key sets which may be any combination of mathematics and ciphering techniques. Although it will be appreciated that the various algorithmic combinations may be infinite in number, a simple example of two variable keys can be illustrated as follows:

$$Kh + Kk = Kc$$

where Kh is the key value stored in the plug-in hardware device (ROM, EE PROM, etc.), Kk the value entered into the computer via the keyboard, and Kc the control key 32 which allows the protected software to run.

For the sake of the example, if the required control key $Kc = 100$, then the sum of Kh and Kk is equal to 100, so that if $Kh = 1$, Kk must be 99, or if $Kh = 1000$, then Kk must be $-900$, etc. It should also be obvious to the reader that additional variables may be included in a similar manner as the first two keys or in other mathematical relationships which can complicate the equation, if desired, which produces the control key, Kc, for example:

$$Kx(Kh + Kk) = Kc$$

where Kx is a third variable.

For $Kc=100$ and $Kh=10$, if: $Kx=1$, $Kk_1$ must equal 90 and if $Kx=2$, $Kk_2$ must equal 40.

Thus, for a given value of Kh, for example a key value stored in a plug-in hardware device 10, it can be seen that there are two values of Kk for two different values of Kx. In a practical and useful sense, Kx can be the control code of a systems manager who allows either user, $Kk_1=90$ or $Kk_2=40$, access to the software.

It is particularly significant and should be noted that no key is stored in the software to be protected and only the algorithm that processes the keys is so stored. The second key which is entered into the computer via the keyboard may obviously be stored in a file having the installation of the protected program and later during the execution of the program retrieved for the sake of convenience from the standpoint of eliminating repetitive reentry of the same sequence of numbers.

The present invention produces a control key based on the processing of unique key pairs or sets (triples, etc.) which of necessity bear an algorithmic relationship to each other. In the preferred embodiment, no two hardware devices contain the identical first keys. Accordingly, second keys are uniquely different for a given algorithm and control key. One advantage of using different key pairs over fixed pairs of keys is that if one pair of keys is discovered by a copier, called a hacker, that key pair would not apply for the next identical piece of software and the work must be done again in trying to find the proper operational sequences.

The importance of having identical software cannot be minimized due to the desirability of replicating the software for distribution. Any change of program material prevents the mass reproduction of the initial software. As soon as any change is made to the software, even if a simple change of key data is made, the software has to be "recompiled" into "machine language" and retested, which are time-consuming endeavors. By eliminating the use of different keys from being recorded in the software to be protected, no recompilation is necessary. In addition, another common problem basic to the application of software which is offered for sale is that modifications of the protected software such as additions, upgrades and/or features which are used to further enhance existing software may be individually useful to certain users and not to others. In the past such additions and upgrades have been supplied to the end-user in one of two ways. First, the developer or distributor may sell the enhancement or upgrade through a separate diskette which may also be protected by yet another hardware key. Secondly, the option or module may already exist on the original software but the ability to execute it may require another correct key or code. In the latter method the desired module could contain all of the same characteristics of key relationships as in the original.

In accordance with the present invention, arrangements can be made to supply and have entered another second key which would produce a second control key derived from the first and newly supplied second keys, using the same algorithm to allow the new module which already exists in the original package to operate. This may be accomplished by entering the other second key which could be received by telephone after verification of credit through the keyboard of the computer. Now suppose that the second key is actually recorded and exists in the software. Accordingly, if the key exists in the software this would necessitate another hardware key to be provided to activate a module even if that module itself was supplied in advance. Accordingly, the present invention eliminates the need for the additional cost of another piece of hardware as well as the cost of shipping and the associated delays provided thereby.

For a given algorithm it has been shown that for every hardware key there exists a unique keyboard entry key which produces the same control key. Paradoxically, many different hardware keys may be provided which operate the same identical software. This can be used to advantage as a control over the history of the software in the same manner as a serial number would be used since arrangements can be made to have every hardware key uniquely different. In the present invention the software may be replicated by normal mass production methods since no keys are actually included in the software, and the software contains only the algorithm. Accordingly, all copies of the software are identical to each other.

The provision of providing unique and different hardware keys which require different matching keyboard entries allows the separate modules to be supplied and distributed along with the original program at the same time. As pointed out above, later activation of any one module would require a keyboard entry, a proper code associated with the particular hardware device originally supplied since the control code of that module would be different than that of the host software. Furthermore if all of the hardware keys are made different, one keyboard entry could not be used to activate another identical software module having a different hardware device supplied with it, thereby limiting distribution to an individual basis.

In addition, it is known that given sufficient time and energy, it would be possible to emulate the action of the hardware device by means of a software program which uses such a device. The present invention is best utilized when no two hardware keys are alike. As previously stated, this prevents the same keyboard entry to operate identical modules. Since each hardware device is uniquely different, even the same software requires its own keyed code thus preventing piracy of the developer's software. In addition, if an attempt is made to emulate the hardware device which proves successful, a completely separate emulation would have to be devised for the next piece of software which would essentially stop any mass attempts to break the security of the protected software in accordance with the present invention.

In providing subsequently issued modifications to the original program, it is also possible to supply another algorithm with the upgrade which can use the existing first and second keys to produce a different control key or preferably to use a third key (new second key) which in combination with the first key in the hardware device produces a new control key when processed by the algorithm in the modification.

Summarizing the use of the present invention can provide the ability using a new second key to remotely upgrade or add additional functionality to the original software while limiting the upgrade to those possessing the unique first hardware key, in effect securing all other identical software from operating identical upgrades without authorization. Additionally the beneficial use of an algorithm to produce a result which can be used in a functional matter as opposed to a decision-making comparison mechanism enhances the security system tremendously. Finally, all the software can be mass replicated using normal production practices without sacrificing the security of execution control of each of the identical replicated software by means of unique key pairs.

Since other changes and modifications varied to fit particular operating requirements and environments will be apparent to those skilled in the art, the invention is not considered limited to the examples chosen for purposes of illustration and includes all changes and modifications which do not constitute a departure from the true spirit and scope of this invention as claimed in the following claims and equivalents thereto.

What is claimed is:

1. A method of protecting computer software from unauthorized execution using multiple keys, one of which is stored in a hardware device to produce a control key which will allow the protected software to execute comprising the steps of:

storing a plurality of unique first keys in a plurality of hardware devices, each hardware device having its own unique first key, establishing a plurality of unique second keys, each having a predetermined relationship with one of each of said first keys forming a plurality of unique key pairs, storing an algorithm for processing said unique key pairs in software which is desired to be protected, supplying identical copies of said software to be protected together with said hardware devices, each having one of said first keys, one device with each of said copies, supplying said second key that forms said key pair with one of said first keys in said hardware device, inserting one of said hardware devices in an input/output port of said computer, loading said software to be protected containing said algorithm in said computer, loading a second key external to said software to be protected in said computer, and processing said first and second keys in said algorithm for deriving a control key, if present, for permitting the continued processing of the software being protected.

2. The method as claimed in claim 1 wherein said step of loading said second key is performed using an input port of a computer.

3. The method as claimed in claim 2 wherein said step of loading said second key entered through any input port is stored in a hard disk file in said computer for subsequent retrieval.

4. The method as claimed in claim 1 including the steps of supplying at least one additional key loading said at least one additional key external to said software which bears a relationship to said first key configured in said algorithm and processing said at least one said additional keY with said first key in said algorithm for producing a new control key for the purpose of allowing other parts of the original software to be enabled.

5. The method as claimed in claim 1, including the steps of supplying a modification for said protected program having an additional algorithm in said modification, supplying a unique third key with said modification which bears a unique relationship to and forms another key pair with said unique first key stored in said hardware device, loading said unique third key in said computer and processing said first and third keys in said additional algorithm for deriving another control key for permitting processing of software modifications being protected.

* * * * *